UNITED STATES PATENT OFFICE.

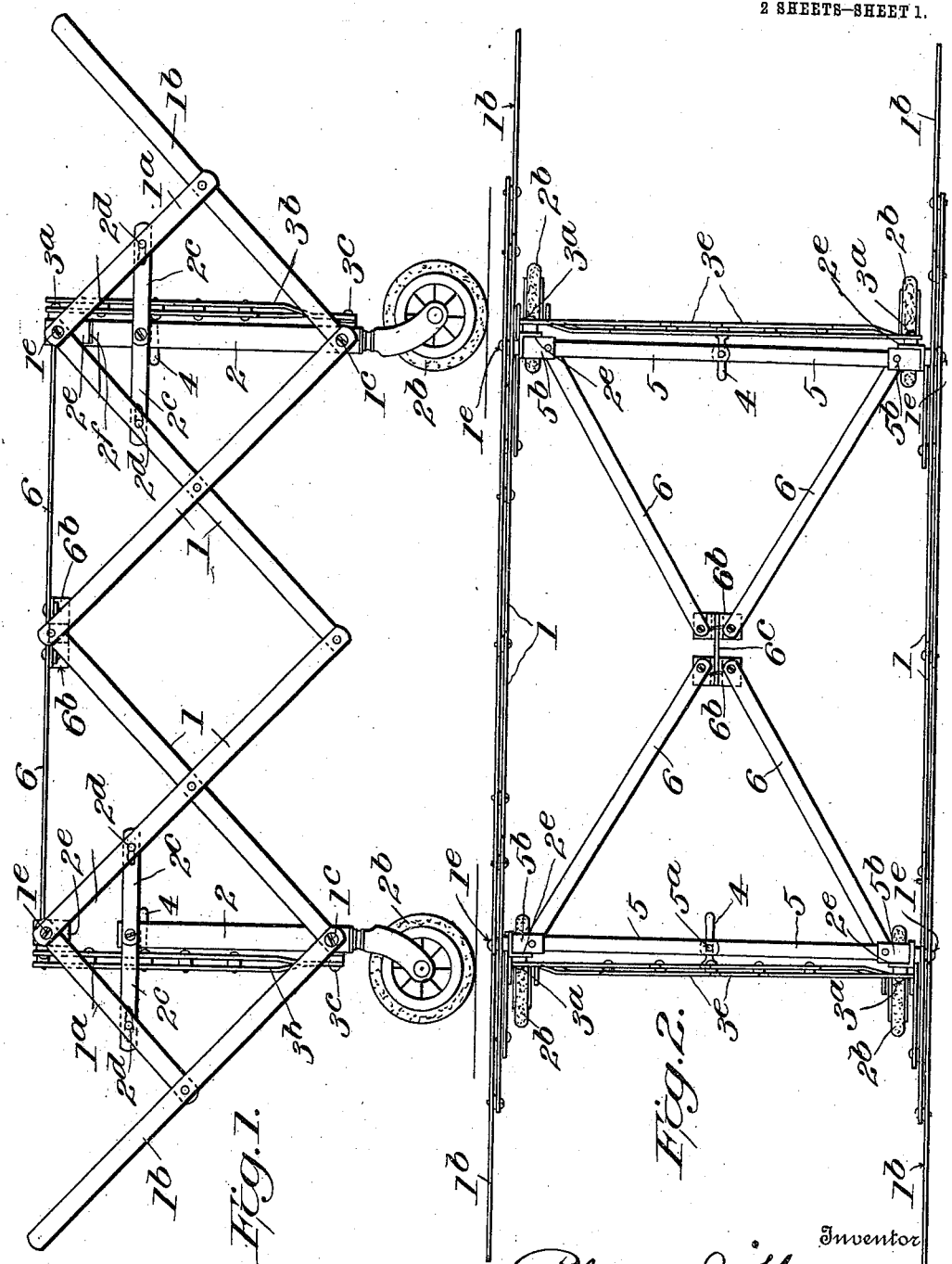

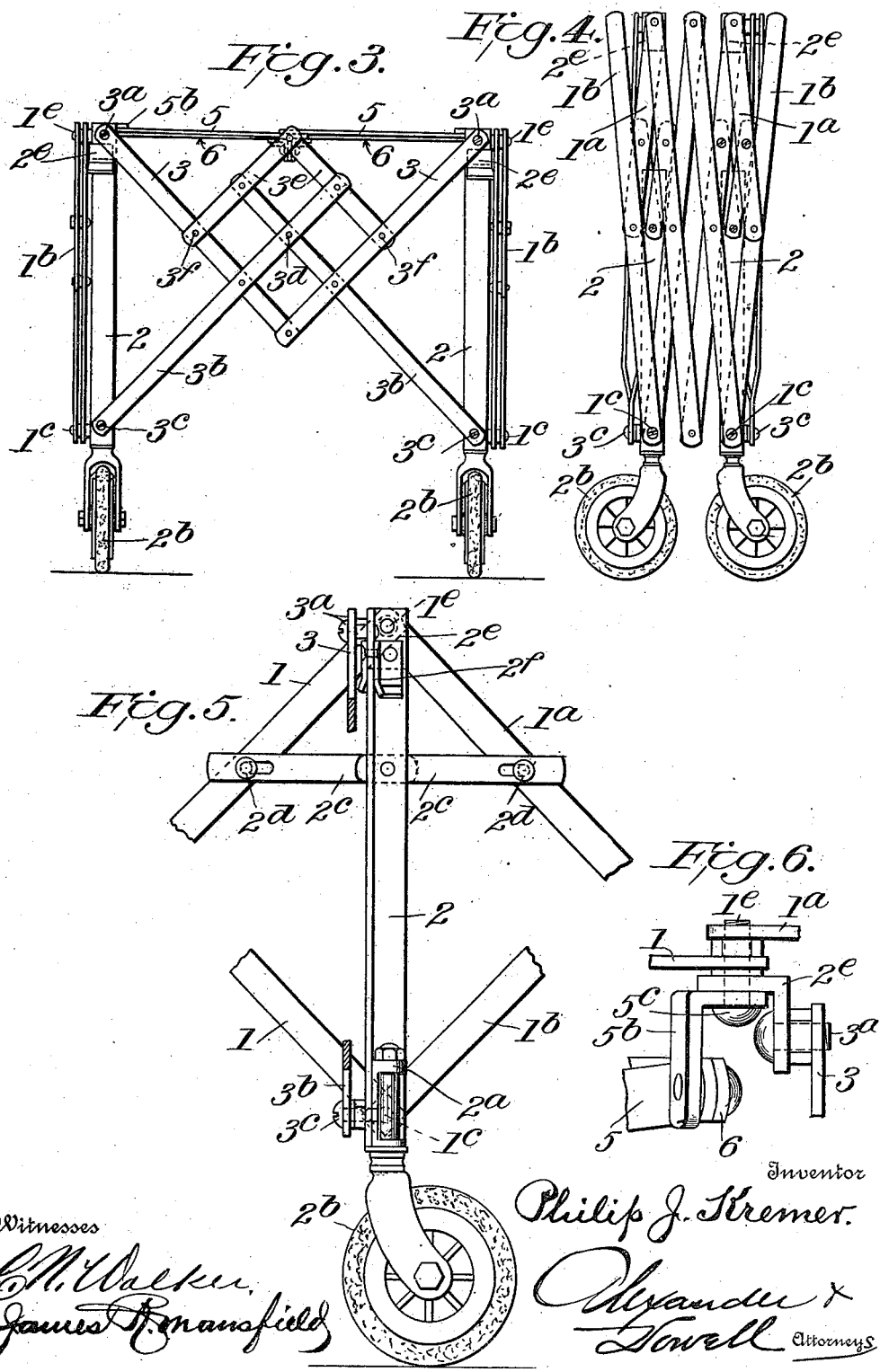

PHILIP J. KREMER, OF SOMERTON, OHIO.

FOLDING FRAME FOR TRUCKS.

974,678. Specification of Letters Patent. Patented Nov. 1, 1910.

Application filed April 26, 1910. Serial No. 557,815.

*To all whom it may concern:*

Be it known that I, PHILIP J. KREMER, of Somerton, in the county of Belmont and State of Ohio, have invented certain new and useful Improvements in Folding Frames for Trucks; and I hereby declare that the following is a full, clear, and exact description thereof, reference being had to the accompanying drawings, which form part of this specification.

This invention is an improvement in "casket trucks" which are especially designed for use by undertakers, to support caskets or coffins when moving same from one portion of a building to another; and the object of the invention is to provide a simple strong collapsible truck of light structure but capable of supporting very great weight, and which can be folded into small compass when not in use, and will be well braced when extended so as to steadily support a casket, and enable it to be readily moved therewith.

The invention consists in the novel construction of the truck as a whole and of various parts thereof, and will be hereinafter fully explained with reference to the accompanying drawings and summarized in the claims appended to the description.

In said drawings:—Figure 1 is a side view of the truck expanded in position for use. Fig. 2 is a top plan view of Fig. 1. Fig. 3 is an end view thereof. Fig. 4 is a side view of the truck folded. Fig. 5 is an enlarged detail view of one corner portion of such truck. Fig. 6 is a detail view.

The sides and ends of the truck are each composed of members pivotally united in "lazy-tongs" style; each side comprises a number of intersecting bars 1, preferably of metal, which are pivotally connected together at their points of intersection and at their ends, but the outermost bars $1^a$ are cut off at their points of intersection with the outermost bars $1^b$ (Fig. 1), and the latter however extend upward sufficiently to support the casket at points beyond the end members of the truck frame. The lower ends of the outermost members $1^b$ are pivotally connected at $1^c$ to the lower ends of the uprights or standards 2, which are preferably made of angle-iron and are provided at their lower ends with castings $2^a$ in which are journaled stems of the caster-wheels $2^b$, see Fig. 5.

To each standard 2, near the upper end thereof, are pivotally connected stay-bars $2^c$ which are slidably connected at $2^d$ to the adjacent bars 1, $1^a$ of the side frames. And these stay-bars serve the double purpose of limiting the extension, or opening up, of the side frames, and of also holding the upper ends of the standards 2 in vertical position when the truck is opened.

The upper ends of the outermost bars $1^a$ and the adjacent inner bars 1 are pivotally connected at $1^e$ to castings or corner members $2^e$ which form the connections between the upper ends of the side and end frames of the truck as hereinafter described, and also serve as rests or supports for the casket when placed upon the truck. The corner members $2^e$ are also preferably adapted to engage the upper ends of the standards 2, when the truck is extended, so as to transmit most of the weight of the casket resting upon the truck directly to the standards 2, thereby relieving the side and end frames of the truck and the joints and braces thereof from a great deal of strain. I do not wish to be restricted to having the corner members $2^e$ arranged to directly rest upon the standards 2 when the frame is extended although I prefer to have them so, as the standards could be made so short—(as indicated at the left-hand side of Fig. 1)—that the corner-members $2^e$ will not contact with the standards; but preferably, as indicated at the right-hand side of Fig. 1 and in Fig. 3, the corner members $2^e$ are adapted to directly rest upon the upper ends of the standards 2 when the truck is extended; I also preferably so construct or provide the corner members and standards that they will interlock when in contact. This may be conveniently done as shown, by providing each corner-member $2^e$ with depending extensions $2^f$ between which the upper end of the related standard 2 enters when the truck is extended (Figs. 3 and 5); thus locking these parts to each other when the truck is extended.

The end frames of the truck are also preferably made of bars united in lazy-tongs fashion; and as shown in Fig. 3 the outer ends of the upper bars 3 of the end frames are pivotally connected, as at $3^a$, to the corner-members $2^e$, and the lower ends of the outer members $3^b$ are pivotally connected as at $3^c$ to the lower ends of the standards 2. The bars 3, $3^b$, are pivotally connected at their points of intersection, and the lower ends of the two bars 3 are pivotally connected together. The upper ends of the bars 3ᵇ extend beyond their points of intersection with the bars 3, and are pivotally connected as at 3ᵈ at their own points of intersection, but extend beyond the points of intersection, 3ᵈ, and each is pivotally connected at its upper end to the center of a short bar 3ᵉ, which bars 3ᵉ in turn are pivotally connected together at their upper ends, and at their lower ends are pivotally connected as at 3ᶠ to the bars 3. These extra bars 3ᵉ connected with the bars 3, 3ᵇ, as described, give considerable additional strength and stiffness to the end members of the frame, when the truck is extended. Hand pieces 4 may be attached to the end members at the pivots 3ᵈ to facilitate carrying of the truck frame when it is closed.

To give additional stiffness and strength to the truck when opened the corner members 2ᵉ may also be connected by top foldable braces (Figs. 2 and 6) comprising end-links 5 pivotally connected at 5ᵃ and having their outer ends pivotally connected to angle-pieces 5ᵇ which are in turn pivoted to the corner-members 2ᵉ, as shown at 5ᶜ. The links 5 brace the truck laterally when extended. To further brace the frame longitudinally links 6 may be pivotally connected at their outer ends to angle pieces 5ᵇ and at their inner ends to angle-pieces 6ᵇ which are in turn pivotally connected to a tie 6ᶜ, see Figs. 1, 2 and 3. The braces 5 and 6 are foldable with the truck by depressing the member 6ᶜ, and the truck can be folded into a very small compass as shown in Fig. 4.

What I claim is:

1. In a casket truck, an end frame comprising four bars pivotally united in lazy-tongs fashion, the upper ends of the two lowermost bars extending beyond their points of intersection with the upper bars and intersecting each other and extended beyond their own point of intersection; short bars pivotally connected at center to the upper ends of the lowermost bars, said short bars being pivotally connected at their upper ends, and also pivotally connected at their lower ends to the two upper bars above the points of intersection of the upper bars with the lower bars, substantially as described.

2. In an extensible truck frame, the combination of extensible side and end members, and corner members; with a collapsible top member comprising links each pivotally connected at their outer ends to an angle piece pivoted to a corner member of the truck frame and at its inner end to an angle piece, and a bar pivotally connecting the inner angle pieces.

3. A foldable truck comprising extensible side-frames and end-frames connected at the corners of the truck; with links pivotally connected to each other and to the frames to limit the lateral expansion thereof, and links pivotally connected to the frames at their outer ends and to angle pieces at their inner ends, and a tie-piece to which the said angle pieces are pivotally connected, to limit the longitudinal expansion of the frames.

4. In a truck-frame, the combination of lazy-tong side-frames and lazy-tong end-frames, standards at the corners of the truck pivotally connected at their lower ends to the adjacent side and end frames, and links connecting the upper ends of the standards with the adjacent lazy-tong members of the side frame; with links pivotally connected to the frames at their outer ends and to angle-pieces at their inner ends, and a tie-piece pivotally connecting said angle-pieces, substantially as described.

5. In a truck-frame, the combination of lazy-tong side-frames and lazy-tong end-frames, standards at the corners of the truck pivotally connected at their lower ends to the adjacent side and end frames, corner members connecting the adjacent side and end frames above the standards, and links connecting the upper ends of the standards with the adjacent lazy-tong members of the side frame; with links pivotally connected to each other and to the adjacent corner members of the frame, and links pivotally connected to the corner members of the truck-frame at their outer ends and to angle-pieces at their inner ends, and a tie-piece pivotally connecting said angle-pieces, substantially as described.

6. In a truck frame, the combination of lazy-tong side-frames, and end-frames, standards at the corners of the truck pivotally connected at their lower ends to the adjacent side and end frames, and a pair of oppositely extending links pivotally connected to the upper end of each standard at one end and at the other end slidably connected to opposite lazy-tong members of the side frame adjacent the standards to limit the extension of such frame, substantially as described.

7. In a truck frame, the combination of lazy-tong side-frames, and end-frames, standards at the corners of the truck pivotally connected at their lower ends to the lower portions of the adjacent side and end frames, corner members above the standards pivotally connected to the upper portions of the adjacent side and end frames, and a pair of links pivoted to the upper end of each standard and extending in opposite directions therefrom and slidably connected at their outer ends with opposite adjacent members of the adjacent side frame to limit the extension of the truck, substantially as described.

8. In a truck frame, the combination of extensible side-frames and end-frames, standards at the corners of the truck pivotally connected at their lower ends to the adjacent side and end frames, corner members pivotally connected to the adjacent side and end frames above the standards, and a pair of links pivotally connected with the upper end of each standard and with opposite members of the adjacent side frame to limit the extension of the frame, said corner members being adapted to rest upon the standards when the frame is extended and provided with means to engage the upper ends of the standards and lock the corner members thereto.

In testimony that I claim the foregoing as my own, I affix my signature in presence of two witnesses.

PHILIP J. KREMER.

Witnesses:
O. T. SEVERNS,
J. S. WILSON.